United States Patent Office 3,414,699
Patented Dec. 3, 1968

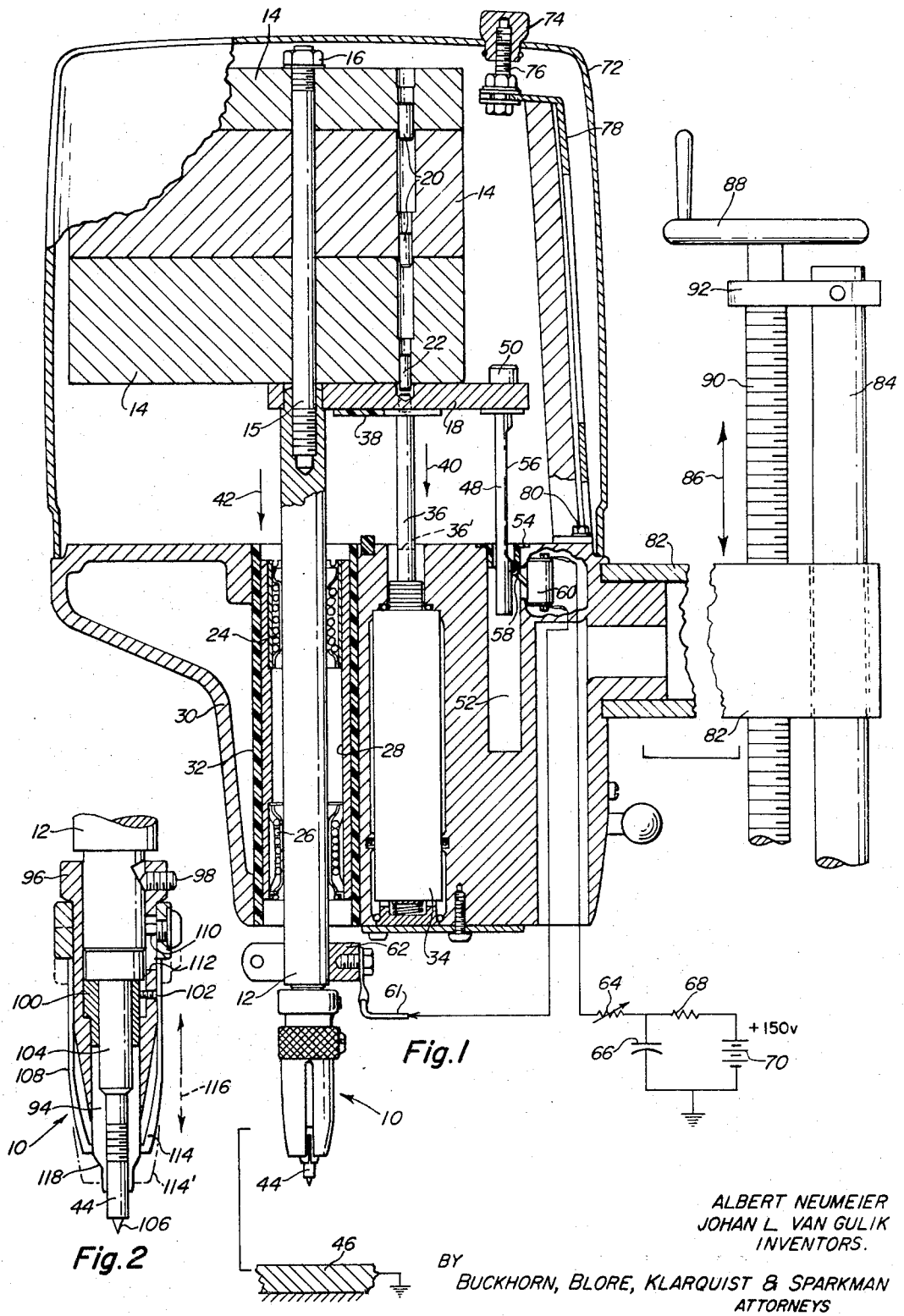

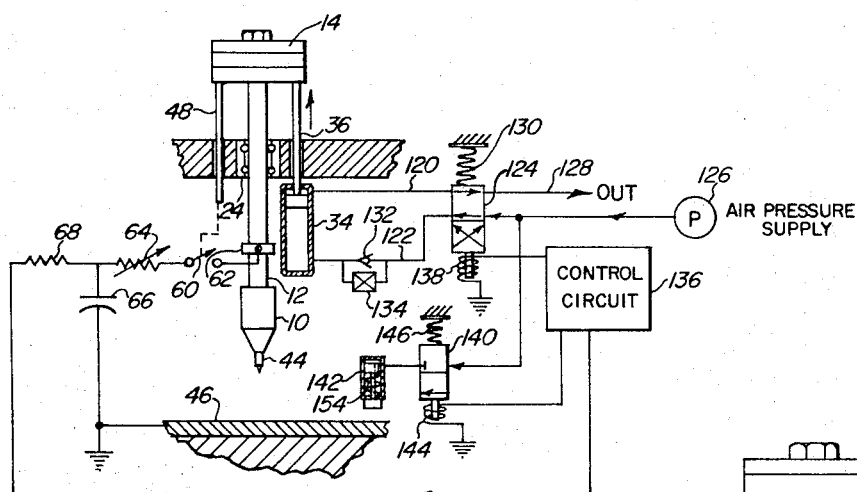
Fig. 3A
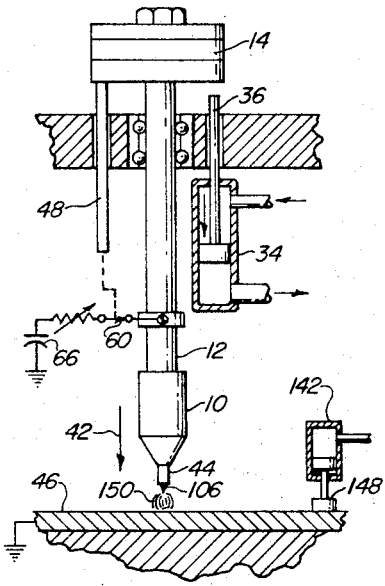
Fig. 3B
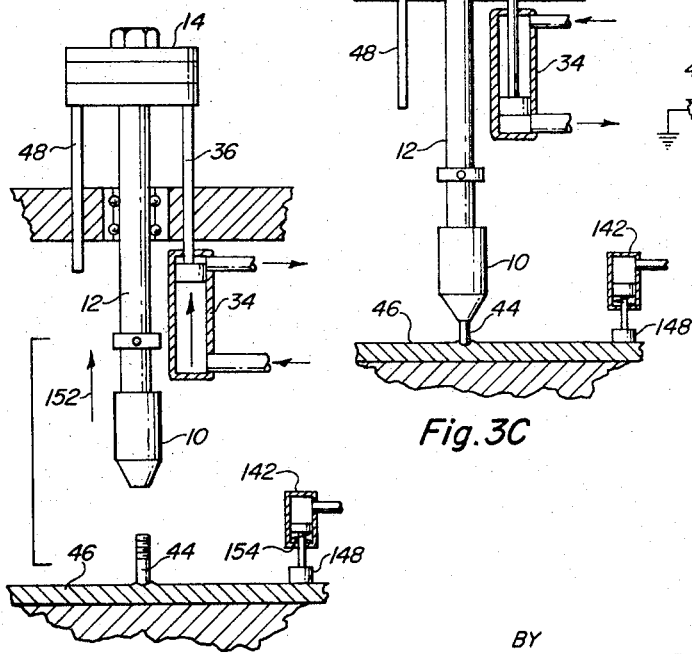
Fig. 3C
Fig. 3D

3,414,699
GRAVITY DROP STUD WELDING APPARATUS
Albert Neumeier, Milwaukie, and Johan L. Van Gulik, Lake Oswego, Oreg., assignors to Omark Industries, Inc., Portland, Oreg., a corporation of Oregon
Filed Aug. 24, 1964, Ser. No. 391,554
9 Claims. (Cl. 219—95)

ABSTRACT OF THE DISCLOSURE

A percussion type stud welding apparatus is described in whcih the stud is caused to fall freely downward into contact with the workpiece entirely by the force of gravity and arc welded to such workpiece. The stud holder and support plunger are held above by the workpiece by a fluid actuated piston separate from such plunger. The stud holder is of the collapsible type which automatically releases the stud upon impact with the workpiece to prevent rebound.

---

The subject matter of the present invention relates generally to stud welding apparatus, and in particular to percussion type stud welders in which the stud holder and its support shaft are dropped and allowed to fall freely by gravity through a predetermined distance to cause the stud within such holder to strike a workpiece with a predetermined force. An electrical energy storage means such as a capacitance is connected to the stud holder to produce an electrical arc between the welding stud in such holder and the workpiece in order to melt only the surface of the tip end of the stud and the surface of a portion of the workpiece lying beneath such tip end so that the stud is fused to the workpiece when they are driven together.

Since the force of gravity is constant, and the apparatus is mounted so that there is very little friction resisting the downward movement of the stud holder and its support shaft, the speed at impact of such holder and the stud contained therein is substantially the same for each weld for a given height setting or spacing of the stud from the workpiece. This means that welds formed by the gravity drop method are of more nearly uniform strength than those formed by welding apparatus employing springs, solenoids or fluid pressure to move the stud downward into contact with the workpiece. The force with which the welding stud strikes the workpiece can be increased by securing weights of known value to the opposite end of the support shaft from the stud holder. As a result, even though the stud is moved through a relatively short distance of only 2 to 3 inches and is traveling at a fairly slow velocity when it strikes the workpiece, the upset force produced on such stud during impact is sufficient to produce satisfactory results due to the large mass of the weights secured to the stud holder shaft. Thus, the force with which the stud strikes the workpiece can be varied by adjusting the amount of weight supported on the stud holder shaft or by changing the distance through which the stud is dropped onto the workpiece.

The stud welding apparatus of the present invention is especially useful for welding studs to the surfaces of thin sheets of metal or other workpieces of large area for the attachment of another member thereto by screw threads or other means provided on such studs. The stud holder may be in the form of the collapsible type shown in copending U.S. patent application, Ser. No. 338,987, filed Jan. 20, 1964, by Albert Neumeier so that such stud holder automatically releases the welding stud when such stud strikes the workpiece. This prevents movement of the welding stud away from the workpiece after impact when the stud holder and support shaft rebound upward due to the shock of such impact and prevents such rebound from causing a faulty weld. In addition, this collapsible stud holder grips the welding stud more tightly as such stud initially approaches the workpiece to enable better electrical contact between such holder and such stud.

The welding studs may each be provided with a pointed tip portion projecting centrally from one end thereof and of smaller cross sectional area than the shank of the stud. This enables an electrical arc to be produced across the gap between the stud tip and the workpiece before physical contact as such stud initially approaches the workpiece due to the high electrical field caused by the small radius of curvature of the tip point. Current does not begin to flow through the stud until the electrical arc is produced, and then rapidly heats and vaporizes the tip portion. The metal vapor of the tip reduces the resistance of the gap and the arc current increases to rapidly melt the entire surface of the end of the stud and the surface of the portion of the workpiece lying immediately beneath such stud. The electrical arc does not cause any appreciable heating of portions of the stud and workpiece remote from the surfaces which are to be welded together. As a result of this more efficient heating, larger diameter welding studs, on the order of ¼ inch and higher of aluminum, have been successfully welded at relatively low voltages and currents of about 150 volts and 30 amperes. This would not be possible with the early percussion welding apparatus, shown in U.S. Patent 1,066,468 by Chubb, since it was only capable of welding small diameter wires together which explains to some extent why that apparatus was never used for stud welding.

Briefly one embodiment of the stud welding apparatus of the present invention includes a stud holder attached to one end of a support shaft which is mounted for vertical reciprocating movement within a housing by means of ball bearing bushings or other suitable low friction mounting means. A fluid cylinder and piston are mounted adjacent the stud holder shaft so that such piston engages a member attached to the shaft to raise such shaft and hold the stud holder a predetermined distance over a workpiece. A plurality of iron plates or other weights are attached to the opposite end of the stud holder shaft to increase the force with which the welding stud strikes the workpiece. The support cylinder is a double acting cylinder which is connected through a two position valve to a source of pressurized air and an exhaust outlet in order to raise and lower the piston in such cylinder depending upon the position of such valve. In addition, a clamp cylinder may also be employed to hold the workpiece in a fixed position during welding. A guide rod is secured to the stud holder shaft to prevent rotation of such shaft during downward movement thereof so that the stud is not twisted during welding which could produce a defective weld. The stud holder is collapsible and includes a chuck and a sliding collet surrounding such chuck which continues its downward movement because of inertia to cause the chuck to release the stud upon impact and to prevent rebound of such stud away from the workpiece with such chuck which might otherwise produce a defective weld. The stud holder is connected to a storage capacitor charged to a predetermined voltage, by means of a cam actuated switch which is closed by the guide rod in response to downward movement of the holder shaft. In order to adjust the distance between the welding stud and the workpiece in the raised position of the stud holder, the housing, the stud holder, support shaft, weights, support cylinder and guide rod are moved together with respect to the workpiece in order to accommodate different size workpieces and to allow a full upward stroke of the cylinder piston and the guide rod at all distance settings for proper operation of the cam actuated switch by such guide rod.

It is therefore one object of the present invention to provide an improved welding apparatus which produces stronger welds that are more uniform.

Another object of the invention is to provide an improved stud welding apparatus in which the stud holder is held a predetermined height above a workpiece and allowed to drop freely by gravity to cause a stud within such holder to strike such workpiece at a predetermined speed which is substantially the same for all welds made with the same height setting.

A further object of the present invention is to provide an improved stud welder including a weight rigidly attached to the support shaft of the stud holder to increase the force with which the stud within such holder strikes a workpiece and in which a collapsible stud holder is employed to release the stud upon impact with the workpiece to prevent movement of the stud away from the workpiece during the rebound of such stud holder.

An additional object of the present invention is to provide an improved percussion type stud welding apparatus in which the support shaft of the stud holder is held by the piston of a separate fluid cylinder to space the stud holder a predetermined distance above the workpiece and such piston is rapidly moved downward away from its supporting position to enable the stud holder and shaft to fall by gravity at a slower speed toward such workpiece without restricting the downward movement of such shaft and holder to any appreciable extent.

Still another object of the invention is to provide an improved percussion type stud welder in which a welding stud having a pointed tip is moved into contact with the workpiece, and in which an electrical arc is produced between such tip and such workpiece before contact in order to melt the surface of one end of such stud and a portion of the workpiece more efficiently so that studs of larger cross sectional area can be welded at low voltages and currents.

Other objects and advantages of the present invention will be apparent from the following detailed description of a preferred embodiment thereof and the attached drawings of which:

FIG. 1 is a partial section view of one embodiment of the stud welding apparatus of the present invention with parts broken away for clarity;

FIG. 2 is an enlarged section view of the collapsible stud holder employed in the apparatus of FIG. 1;

FIGS. 3A, 3B, 3C and 3D show schematically different steps of the operation of the stud welding apparatus of the present invention.

As shown in FIG. 1, one embodiment of the stud welding apparatus of the present invention includes a collapsible stud holder 10 which may be of the type shown in copending U.S. patent application, Ser. No. 338,987, referred to previously, that is attached to the lower end of a support shaft 12. A plurality of weights 14 in the form of triangular plates of iron, lead or other suitable heavy metal are attached to the other end of the support shaft 12 by means of a tie rod 15 having a nut 16 threaded on one end thereof and extending through the centers of gravity of such weights with its other end threaded into a cavity in the upper end of such shaft. A weight support frame 18 is attached to the upper end of the support shaft 12, and the weights 14 are rigidly clamped between the nut 16 and such frame. The weights 14 are connected together by pins 20 positioned in holes bored through such weights and are similarly connected to the support frame 18 by a pin 22 to prevent rotational movement of such weights with respect to the tie rod 15.

The support shaft 12 is mounted within a pair of ball bearing bushings 24 and 26 that are held within a tubular retainer 28 and supported within a housing 30 by a friction frit between such retainer and a sleeve 32 of electrical insulating material. The support shaft is moved upward within the bushings 24 and 26 by means of a fluid operated cylinder 32 mounted within the housing 30. A piston rod 36 extending out of such cylinder engages a stop plate 38 of insulating material attached to the lower surface of the support frame 18, slowly raises the support frame and the stud holder shaft to the position shown and holds them in that position. The cylinder 34 may be a double acting air cylinder which rapidly moves the piston rod 36 downward in the direction of arrow 40 until its upper end is in the lowered position 36', shown in dashed lines, when a weld is to be made. When this happens, the support shaft 12, the weights 14 and the stud holder 10 move downward in the direction of arrow 42 due to the force of gravity at a slower rate of speed than pistons 36 until a welding stud 44 held within the stud holder strikes a workpiece 46 supported beneath such stud holder.

A guide rod 48 is secured within an aperture in the support frame 18 for movement with the frame and is insulated from such frame by a sleeve member 50 of electrical insulating material. The guide rod slides downward within a cavity 52 in housing 30 through a guide ring 54 of low friction material secured within the entrance of cavity 52 to prevent rotation of the shaft 12 and the stud holder 10. As a result, the stud is kept from being twisted during welding which might otherwise cause a defective weld.

The guide rod 48 is provided with a longitudinal groove 56 along its outer surface to provide a cam surface for a cam follower roller 58 attached to the movable contact of a switch 60 for closing such switch in response to the downward movement of the guide rod. The switch 60 is connected in series between a lead wire 61 attached to the stud holder shaft 12 by a clamp 62 and variable resistance 64 which is connected to the upper terminal of a storage capacitor 66. The upper terminal of the storage capacitor 66 is also connected through a charging resistor 68 to a D.C. voltage source 70 while the lower terminal of such capacitor is connected to the same potential as the workpiece 48 and the other terminal of the voltage source which may be ground. The storage capacitor is charged to the voltage of source 70 when switch 60 is open and is discharged through the stud holder when such switch is closed and the stud 44 strikes the workpiece 46 in a manner hereafter described.

The housing 30 is provided with a cover 72, secured to such housing by means of a thumb nut 74, threaded onto a bolt 76 extending through a hole in one end of a bracket 78 whose other end is fastened to the housing 30 by means of a bolt 80. The housing 30 is attached to one end of a tubular support 82 which is mounted for sliding movement on a vertical column 84 to enable vertical adjustment of the housing, the cylinder 34, the shaft 12 and the stud holder 10 in the direction of arrows 86 to vary the spacing between the stud and the workpiece in the raised position of the stud. This adjustment may be accomplished by means of a crank wheel 88 and a threaded shaft 90 secured to such crank wheel and supported for rotational movement on column 84 by means of a bracket 92. The threaded shaft 90 extends through a similarly threaded portion of the tubular support 82 for sliding such support up and down along the vertical column 84. Variation of spacing between the welding stud 44 and the workpiece 46 changes the distance through which the stud drops before striking the workpiece so that the speed of such stud at impact is controlled by the height setting. It should be noted that this type of height adjustment has an advantage over using the clamp 62 as a stop to vary the spacing between the raised stud and the workpiece in that the guide rod 48 is always held in the same upper position with respect to the switch 60 regardless of such spacing so that the cam roller 58 is always properly located on the guide rod to open the contacts of such switch in such upper position and to close such contacts immediately after the guide rod begins its downward movement.

When the welding stud 44 strikes the workpiece 46, there is considerable shock transmitted to the stud holder 10 and the support shaft 12 due to the large impact force created by the weights 14. The reaction of the shock causes the stud holder and shaft to rebound from the workpiece and may pull the stud away from such workpiece also so that a defective weld is produced. This can be prevented by employing the collapsible stud holder shown in FIG. 2 which includes a conventional chuck 94 having its forward end split into a plurality of spaced resilient jaw elements which grip the shaft of the welding stud. The chuck 94 is secured to the lower end of the support shaft 12 by means of a support sleeve adapter 96 which is attached to such shaft by means of a set screw 98. The chuck is held in position by an outwardly extending flange portion 100 which engages an internal shoulder of the support sleeve 96 and is provided with a locating notch for engagement with a pin 102 extending through such support sleeve. A cylindrical stop member 104 is provided inside the chuck 100 and is clamped by its enlarged rear end portion between the rear end of such chuck and the end of the support shaft 12. The front end of the stop engages the rear end of the welding stud 44 to properly position such stud within such chuck so that the front end of such stud extends out of the chuck a predetermined distance. It should be noted that the welding stud 44 may be provided with a pointed tip portion 106 of conical shape and of smaller cross sectional area than the shank of the stud for a reason hereafter described with reference to FIG. 3B.

The stud holder is also provided with a sliding collet member 108 which is loosely attached to the support sleeve 96 by means of a guide pin 110 extending into a longitudinal slot 112 through the side of the support sleeve. The sliding collet is split at its front end to provide a plurality of spaced resilient finger portions 114 which engage the outer surface of the resilient jaw elements of the chuck to urge the jaw elements closed into good electrical contact with the welding stud in the raised position of such collet, as shown in solid lines in FIG. 2. When the stud strikes the workpiece, the support sleeve 96 stops along with the chuck 94 since they are rigidly attached to the support shaft 12 and such support shaft is prevented from further downward movement. However, the collet 108 continues moving downward in the direction of arrow 116 due to inertia until the guide pin 110 reaches the lower end of the slot 112 to stop the collet fingers in the dashed line position 114'. This causes the ends of the finger portions 114 to move over a shoulder portion 118 on the chuck jaw elements and enables such jaw elements to spring outwardly to release the welding stud. As a result, the rebounding movement of the chuck does not move the stud away from the workpiece since such stud has already been released from such chuck. It should be noted that the sliding collet 108 is moved to the dashed line position, shown in FIG. 2, before inserting a stud in the chuck 94 during loading, and then the sliding collet is manually moved upward into the solid line position shown to cam the chuck jaw members inwardly and clamp the stud within such chuck.

The operation of the stud welding apparatus of the present invention is best understood with reference to FIGS. 3A, 3B, 3C and 3D which show different steps in such operation. As shown in FIG. 3A, the support cylinder 34 is a double acting cylinder having a pair of connecting lines 120 and 122 at the opposite ends thereof which are each connected through a two-position actuated valve 124 to either a source 126 of pressurized air which can be a pump or to an exhaust outlet 128. When one of the lines 120 and 122 is connected to the pump 126, the other line is connected to the exhaust outlet 128 by valve 124 to enable the piston to move within the cylinder. Valve 124 is normally biased downward in the position shown by means of a spring 130 so that fluid flows from pump 126 through such valve and line 122 into the bottom of the cylinder 34 to raise the piston 36. It should be noted that connecting line 122 may be provided with a check valve 132 and a needle valve 134 connected around such check valve for controlling the rate of flow of fluid into the cylinder from line 122 to cause the piston to slowly rise into the position shown. When it is desired to weld the stud 44 to the workpiece 46, a control circuit 136 transmits current through the solenoid winding 138 of valve 124 to move the valve upward. This connects the pump 126 to the upper end of a cylinder 34 through line 120 and forces the piston rapidly downward at a much faster rate due to the fact that the check valve 132 opens and allows the air to flow freely through such check valve and line 122 to the outlet 128. As a result, the piston 36 moves rapidly away from the support frame of the weights 14 and causes the shaft 12 and stud holder 10 to fall by gravity downward in the direction of arrow 42, as shown in FIG. 3B. At the same time another valve 140, connected between a clamp cylinder 142 and the pump 126, may also be actuated by the control circuit 136, transmitting current through the solenoid winding 144 of such valve. This overcomes the force of a spring 146 normally holding such valve downward in the closed position shown, and moves such valve upward to cause the air to flow into the upper end of the clamp cylinder 142. As a result, the clamp piston 148 in such cylinder is forced downward into contact with the workpiece to hold such workpiece in a fixed position, as shown in FIG. 3B.

As soon as the guide rod 48 begins moving downward with the stud holder shaft 12, such guide rod closes the cam actuated switch 60 to connect the stud holder to the storage capacitor 66, as shown in FIG. 3B. This applies the voltage of the charged storage capacitor 66 to the stud holder and causes an electrical arc 150 to form between the pointed tip portion 106 of the welding stud 44 and the workpiece before such stud strikes such workpiece. This electrical arc rapidly heats and vaporizes the tip portion 106. The metal vapor produced by vaporization of the tip portion 106 increases the current flow in the arc 150 and causes a rapid melting of the entire surface of the tip end of the welding stud and the surface of the portion of the workpiece immediately beneath such stud so that these surfaces are fused together when the stud strikes the workpiece, as shown in FIG. 3C.

When the stud strikes the workpiece, the collapsible stud holder 10 releases such stud and prevents movement of the stud away from the workpiece when the holder rebounds. After the weld is complete, the solenoid 138 of valve 120 is deenergized so that the spring 130 moves such valve back downward to the position shown in FIG. 3A. This causes the piston 36 to rise within the cylinder 34 at a slow rate due to the closing of the check valve 132. The upward movement of the piston rod 36 causes such rod to engage the support frame of the weights 14 and to raise the shaft 12 and stud holder 10 upward in the direction of arrow 152, as shown in FIG. 3D, so that the welded stud is withdrawn from the stud holder. The switch 60 again is opened when the guide rod 48 again reaches the raised position of FIG. 3A to enable the storage capacitor 66 to be again charged through resistor 68. It should be noted that the setting of the variable resistance 64 controls the discharge time of the storage capacitor and the wave form of the discharge current, which is important in the production of strong welds. After the stud 44 has been withdrawn from the stud holder 10, the electrical circuit deenergizes the solenoid 144 of the clamp valve 140 to enable the spring 146 to move such valve downward to the normal position shown in FIG. 3A. This enables the spring 154 within the clamp cylinder to raise the clamp piston 148 upward to the position, shown in FIG. 3A, to unclamp the workpiece and allow such workpiece to be manually moved into a new welding position. This completes one cycle of the welding apparatus of the present invention.

It will be obvious to those having ordinary skill in the art that many changes may be made in the details of the above-described preferred embodiment of the present invention without departing from the spirit of the invention. Therefore the scope of the present invention should only be determined by the following claims.

We claim:
1. Stud welding apparatus comprising:
a plunger member mounted for movement between an upper position and a lower position;
stud holder means attached to said plunger member for movement therewith adapted to hold a welding stud having a tip portion of smaller cross sectional area than the shank of the stud projecting centrally from one end of the stud;
means including a cylinder having a piston separate from the plunger member, for holding said plunger member and said stud holder in said upper position over a workpiece of larger area than said one end of said stud, for causing said plunger member and stud holder to fall freely entirely by gravity at predetermined distance to said lower position in order to strike said workpiece with said one end of said stud at a predetermined speed, and for automatically returning said stud holder to said upper position; and
means for producing an electrical arc between the stud and the workpiece in order to vaporize the tip portion and melt the surfaces of said one end of said stud and a portion of the surface of said workpiece to cause the stud to be fused to the workpiece when they are struck together.

2. Stud welding apparatus comprising:
a support member mounted for movement between an upper position and a lower position;
stud holder means attached to said support member for movement therewith adapted to hold a welding stud having a pointed tip portion of smaller cross sectional area than the shank of the stud projecting centrally from one end of the stud, and for automatically releasing said stud when said stud strikes a workpiece to prevent rebound of the stud away from the workpiece;
control means including a cylinder having a piston separate from the support member, for holding said support member and said stud holder in said upper position over a workpiece of larger area than said one end of said stud, for causing said support member and stud holder to fall freely entirely by gravity a predetermined distance to said lower position in order to strike said workpiece with said one end of said stud at a predetermined speed, and for returning said stud holder to said upper position; and
means for producing an electrical arc between the pointed tip portion of the stud and the workpiece in order to vaporize the tip portion and melt the surfaces of said one end of said stud and a portion of the surface of said workpiece to cause the stud to be fused to the workpiece when they are struck together.

3. Stud welding apparatus comprising:
a plunger shaft mounted for reciprocating movement;
a stud holder attached to said shaft for movement therewith, and adapted to hold a stud having a tip portion of reduced cross sectional area;
weight means attached to said plunger shaft for controlling the force with which the stud in said holder strikes a workpiece;
a double acting fluid cylinder means including a piston separate from the plunger shaft for supporting said plunger shaft and said stud holder in a raised position to space said stud a predetermined distance above the workpiece in a first position of said piston;
valve means for rapidly moving said piston to a second position to remove the support from said plunger shaft and cause said shaft and said holder to fall freely by gravity into a lowered position where said stud strikes said workpiece and is welded thereto, and for returning said piston to said first position to raise said plunger shaft and stud holder to said raised position and remove the welded stud from said holder; and
electrical energy storage means connected to said stud holder for vaporizing the tip portion of the stud and producing an electrical arc between one end of the stud and the workpiece in order to melt the surface of said one end of the stud and a portion of the workpiece to weld the stud to the workpiece when they are struck together.

4. Stud welding apparatus comprising:
a plunger shaft mounted for reciprocating movement;
a stud holder attached to said shaft for movement therewith, and adapted to hold a stud having a portion of reduced cross sectional area;
weight means rigidly attached to said plunger shaft for controlling the force with which the stud in said holder strikes a workpiece;
support means including a fluid actuated piston separate from the plunger shaft for supporting said plunger shaft and said stud holder in a raised position to space said stud a predetermined distance above the workpiece in a first position of said piston;
release means for rapidly moving said piston to a second position to remove the support from said plunger shaft and cause said shaft and said holder to fall freely by gravity into a lowered position where said stud strikes said workpiece and is welded thereto;
said stud holder including a chuck and a sleeve member mounted for sliding movement about said chuck so that said sleeve member causes said chuck to tightly grip the stud in a rearward position of said sleeve member, and cause said chuck to automatically release said stud when said sleeve member is moved to a forward position by the impact of aid stud on said workpiece; and
electrical energy storage means connected to said stud holder for vaporizing the tip portion of the stud and producing an electrical arc between one end of the stud and the workpiece in order to melt the surface of said one end of the stud and a portion of the workpiece to weld the stud to the workpiece when they are struck together.

5. Stud welding apparatus comprising:
a plunger shaft mounted for reciprocating movement;
a stud holder attached to said shaft for movement therewith, and adapted to hold a stud having a tip portion of reduced cross sectional area;
weight means rigidly attached to said plunger shaft for controlling the force with which the stud in said holder strikes a workpiece;
fluid cylinder means including a piston separate from the plunger shaft for supporting said plunger shaft and said stud holder in a raised position to space said stud a predetermined distance above the workpiece in a first position of said piston;
valve means for rapidly moving said piston to a second position to remove the support from said plunger shaft and cause said shaft and said holder to fall freely by gravity into a lowered position where said stud strikes said workpiece and is welded thereto, and for returning said piston to said first position to raise said plunger shaft and stud holder to said raised position and remove the welded stud from said holder;
said stud holder including a chuck and a sleeve member mounted for sliding movement about said chuck so that said sleeve member causes said chuck to tightly grip the stud in a rearward position of said sleeve member, and cause said chuck to automatically release said stud when said sleeve member is moved to a forward position by the impact of said stud on said workpiece; and electrical energy storage means connected to said stud holder for vaporizing the tip portion of the stud and producing an electrical arc between one end of the stud and the workpiece in order to melt the surface to said one end of the stud and a portion of the workpiece to weld the stud to the workpiece when they are struck together.

6. Stud welding apparatus comprising:

a plunger shaft mounted for reciprocating movement;

a stud holder attached to said shaft for movement therewith, and including a stop member for holding a welding stud;

variable weight means attached to said plunger shaft for controlling the force with which the stud in said holder strikes a workpiece;

fluid cylinder means including a piston separate from the plunger shaft for supporting said plunger shaft and said stud holder in a raised position to space said stud a predetermined distance above the workpiece in a first position of said piston;

means for moving the plunger shaft and cylinder to vary the distance said stud is spaced from said workpiece without changing said first position of said piston in said cylinder means;

valve means for rapidly moving said piston to a second position to remove the support from said plunger shaft and cause said shaft and said holder to fall freely by gravity into a lowered position where said stud strikes said workpiece and is welded thereto, and for returning said piston to said first position to raise said plunger shaft and stud holder to said raised position and remove the welded stud from said holder;

guide means for preventing the rotational movement of said stud holder; and electrical energy storage means including a storage capacitor and a switch connected between said capacitor and said stud holder, for transmitting current to said stud when said switch is closed by downward movement of said stud holder to produce an electrical arc between one end of the stud and the workpiece in order to melt the surface of said one end of the stud and a portion of the workpiece to weld the stud to the workpiece when they are struck together.

7. Stud welding apparatus comprising:

a plunger member mounted for movement between an upper position and a lower position;

stud holder means attached to said plunger member for movement therewith, for holding a welding stud with one end of said stud extending out of the stud holder, and for holding the other end of said stud within said stud holder;

support means including a support member separate from said plunger member mounted for longitudinal movement with respect to said plunger member, for moving said plunger member and said stud holder from said lower position to said upper position over a workpiece, for holding said plunger member and said stud holder in said upper position and for causing said plunger member and stud holder to fall freely entirely by gravity a predetermined distance from said upper position to said lower position in order to strike said workpiece with said one end of said stud at a predetermined speed; and means for producing an electrical arc between the one end of the stud and the workpiece in order to melt the surfaces of said one end of said stud and a portion of the surface of said workpiece to cause the stud to be fused to the workpiece when they are struck together.

8. Stud welding apparatus comprising:

a plunger member mounted for movement between an upper position and a lower position;

stud holder means attached to said plunger member for movement therewith, for releasably holding a welding stud having a tip portion of smaller cross sectional area than the shank of the stud projecting centrally from one end of the stud, said stud holder means including means for automatically releasing said stud from the stud holder when said stud strikes a workpiece to prevent rebound of the stud away from the workpiece;

weight means attached to said plunger member for increasing the force with which the stud strikes the workpiece;

support means for moving said plunger member and said stud holder from said lower position to said upper position over a workpiece of larger area than said one end of said stud, for holding them in said upper position and for causing said plunger member and stud holder to fall freely by gravity a predetermined distance from said upper position to said lower position in order to strike said workpiece with said one end of said stud at a predetermined speed; and means for applying a source of electrical curernt between the stud and the workpiece to vaporize said tip portion and produce an electrical arc between the stud and the workpiece in order to melt the surfaces of said one end of said stud and a portion of the surface of said workpiece and cause the stud to be fused to the workpiece when they are struck together.

9. Stud welding apparatus in accordance with claim 8 in which the support means includes a support member separate from said plunger member and mounted for longitudinal movement with respect to said plunger member.

References Cited

UNITED STATES PATENTS

| 1,066,468 | 7/1913 | Chubb | 219—95 |
| 2,518,463 | 8/1950 | Graham | 219—99 |
| 2,610,278 | 9/1952 | Graham | 219—98 |
| 3,352,996 | 11/1967 | Neumeier | 219—98 |

RICHARD M. WOOD, *Primary Examiner.*

C. CHADD, *Assistant Examiner.*

UNITED STATES PATENT OFFICE
CERTIFICATE OF CORRECTION

December 3, 1968

Patent No. 3,414,699

Albert Neumeier et al.

It is certified that error appears in the above identified patent and that said Letters Patent are hereby corrected as shown below:

Column 1, line 12, "whcih" should read -- which --. Column 4, line 12, "pistons" should read -- piston --. Column 7, line 21, "at" should read -- a --. Column 8, line 38, "aid" should read -- said --. Column 10, line 20, "oft he" should read -- of the --.

Signed and sealed this 10th day of March 1970.

(SEAL)

Attest:

Edward M. Fletcher, Jr.

Attesting Officer

WILLIAM E. SCHUYLER, JR.

Commissioner of Patents